United States Patent [19]

Crack

[11] Patent Number: 5,214,979
[45] Date of Patent: Jun. 1, 1993

[54] REMOTE CONTROL MECHANISMS

[75] Inventor: David J. Crack, Chelmsford, England

[73] Assignee: Morse Controls Limited, Basildon, England

[21] Appl. No.: 884,948

[22] Filed: May 18, 1992

[30] Foreign Application Priority Data

May 21, 1991 [GB] United Kingdom ................ 9110930

[51] Int. Cl.[5] .............................................. F16C 1/10
[52] U.S. Cl. ............................... 74/502.2; 74/501.5 R; 74/502.4; 74/512
[58] Field of Search .............. 74/502.2, 512, 501.5 R, 74/502.4, 109, 518

[56] References Cited

U.S. PATENT DOCUMENTS

| | | | |
|---|---|---|---|
| 3,039,322 | 6/1962 | Powrie | 74/512 X |
| 3,077,790 | 2/1963 | Wolfe | 74/502.2 X |
| 3,398,817 | 8/1968 | Shinga | 192/1.3 |
| 3,625,087 | 12/1971 | Flory et al. | 74/512 X |
| 4,005,616 | 2/1977 | Casey | 74/512 |
| 4,018,103 | 4/1977 | Chamberlain | 74/519 |
| 4,232,565 | 11/1980 | Leonheart | 74/502.2 X |
| 4,399,901 | 8/1983 | Kobayashi et al. | 74/501.5 R X |
| 4,497,399 | 2/1985 | Kopich | 74/512 X |
| 4,570,508 | 2/1986 | Nicholson et al. | 74/535 |
| 4,785,683 | 11/1988 | Buckley et al. | 74/502.2 X |
| 4,799,468 | 1/1989 | Farquhar | 74/501.5 R X |
| 4,841,798 | 6/1989 | Porter et al. | 74/501.5 R |
| 4,850,241 | 7/1989 | Buckley et al. | 74/502.2 |
| 4,958,536 | 9/1990 | Baumgarten | 74/501.5 R |
| 4,958,607 | 9/1990 | Lundberg | 74/512 X |
| 4,975,988 | 12/1990 | Won | 74/512 X |
| 5,044,223 | 9/1991 | Mizuma et al. | 74/512 |

FOREIGN PATENT DOCUMENTS

| | | |
|---|---|---|
| 101594.4 | 6/1991 | Fed. Rep. of Germany . |
| 1014395 | 6/1952 | France . |
| 1514309 | 1/1968 | France . |

Primary Examiner—Rodney H. Bonck
Assistant Examiner—Andrea Pitts
Attorney, Agent, or Firm—James Creighton Wray

[57] ABSTRACT

A remote control mechanism comprises a foot pedal 2 which is pivotable about an axis 3 to effect rotation of a quadrant gear 17 about the same axis. A pinion 19 meshes with the quadrant gear and is rotatably fast with a snail cam 20 which pivots about the pinion axis. The snail cam 20 has a continuously variable velocity ratio and has attached to it the core 4 of a cable 5 so that the core is translated within the cable casing 6 when the snail cam 20 is pivoted about the pinion axis in response to an operative pivotal movement of the foot pedal 2. Successive regions of the cam periphery 33 of the snail cam engage and pick up the cable core 4 as the snail cam is pivoted, the radius of pick-up decreasing as the snail cam is pivoted by the operative movement of the foot pedal 2. The cable core 4 operates an injection pump unit against a spring loading which increases the more the core is translated and the increasing velocity ratio of the snail cam 20 is matched to the increasing load on the cable core to give a substantially constant load feed on the foot pedal 2 throughout its range of travel.

21 Claims, 11 Drawing Sheets

REMOTE CONTROL MECHANISMS

BACKGROUND OF THE INVENTION

This invention relates to remote control mechanisms.

According to the present invention there is provided a remote control mechanism comprising a control member, a cam pivotable about an axis in response to operative movement of the control member, the cam having a variable velocity ratio, and a cable having a core translatable with a casing, the cable core being attached to the cam so as to be translated with respect to the cable casing as the cam is pivoted about the axis, successive regions of the surface of the cam engaging the cable core as the cam is pivoted about the axis, the radius of pick-up of the cable core on the cam surface with respect to the pivotal axis of the cam varying as the cam is pivoted by the operative movement of the control member.

Pedal operated remote control mechanism are known of which the foot pedal when subjected to an operative pivotal movement causes translation of a link member to activate an output or controlled member. Such operative movement is commonly resisted by a spring bias, which may be provided in the output or controlled end of the mechanism or in the foot pedal mechanism itself, or in both, and which will return the foot pedal back to its original orientation when the foot pressure on its is released.

In such an arrangement, the spring force resisting the operative motion of the pedal increases with increasing operative movement of the pedal so that the operator has to impart an increasing foot pressure upon the pedal the more the pedal is depressed.

SUMMARY OF THE INVENTION

We have developed a pedal operated remote control mechanism constructed in accordance with the invention which gives a substantially constant load feel to the operator throughout the operative travel range of the pedal, this result being obtained by to match the increasing spring loading on the cable core the more the core is translated.

Such a pedal operated remote control mechanism is particularly advantageous when applied to operating the injection pump unit of heavy trucks with which the spring load in the pump unit at maximum throttle resisting pedal movement may be in the order of 14 kg. However, the invention is to be understood as not being confined to such an environment nor, indeed, to an accelerator or throttle pedal mechanism as such, but rather as being applicable to any mechanism in which a cam having an increasing or decreasing velocity ratio is to impart operative motion of an input or control member, whether or not in the form of a pedal, to an output or controlled member.

In order that the invention may be well understood there will now be described some embodiments thereof, given by way of example, reference being had to the accompanying drawings, in which:

DETAILED DESCRIPTION OF THE DRAWINGS

Figure 1:
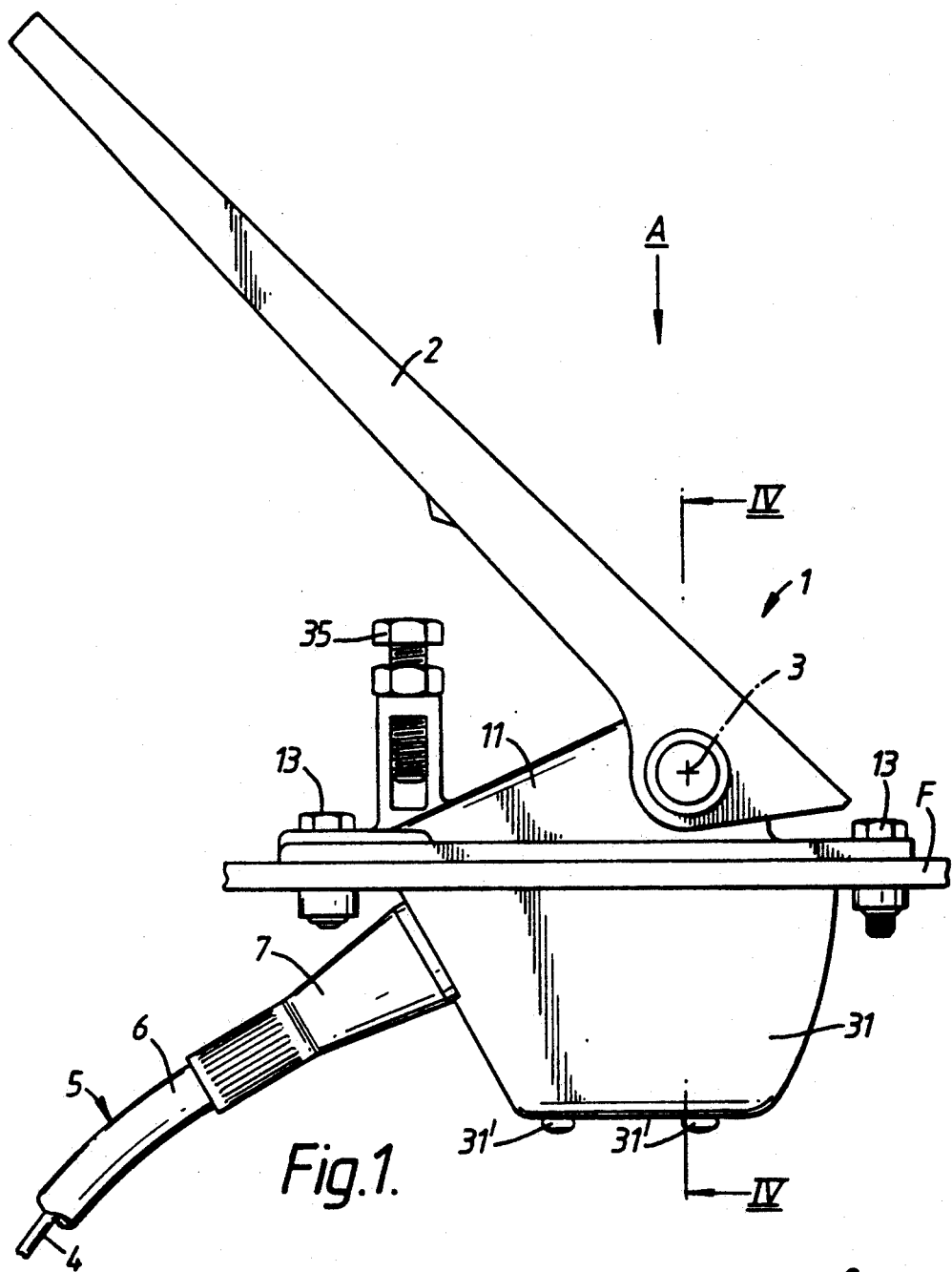
FIG. 1 is a side elevation of a pedal operated mechanism.

In the drawings, like parts are denoted by like reference numerals.

Figure 3:
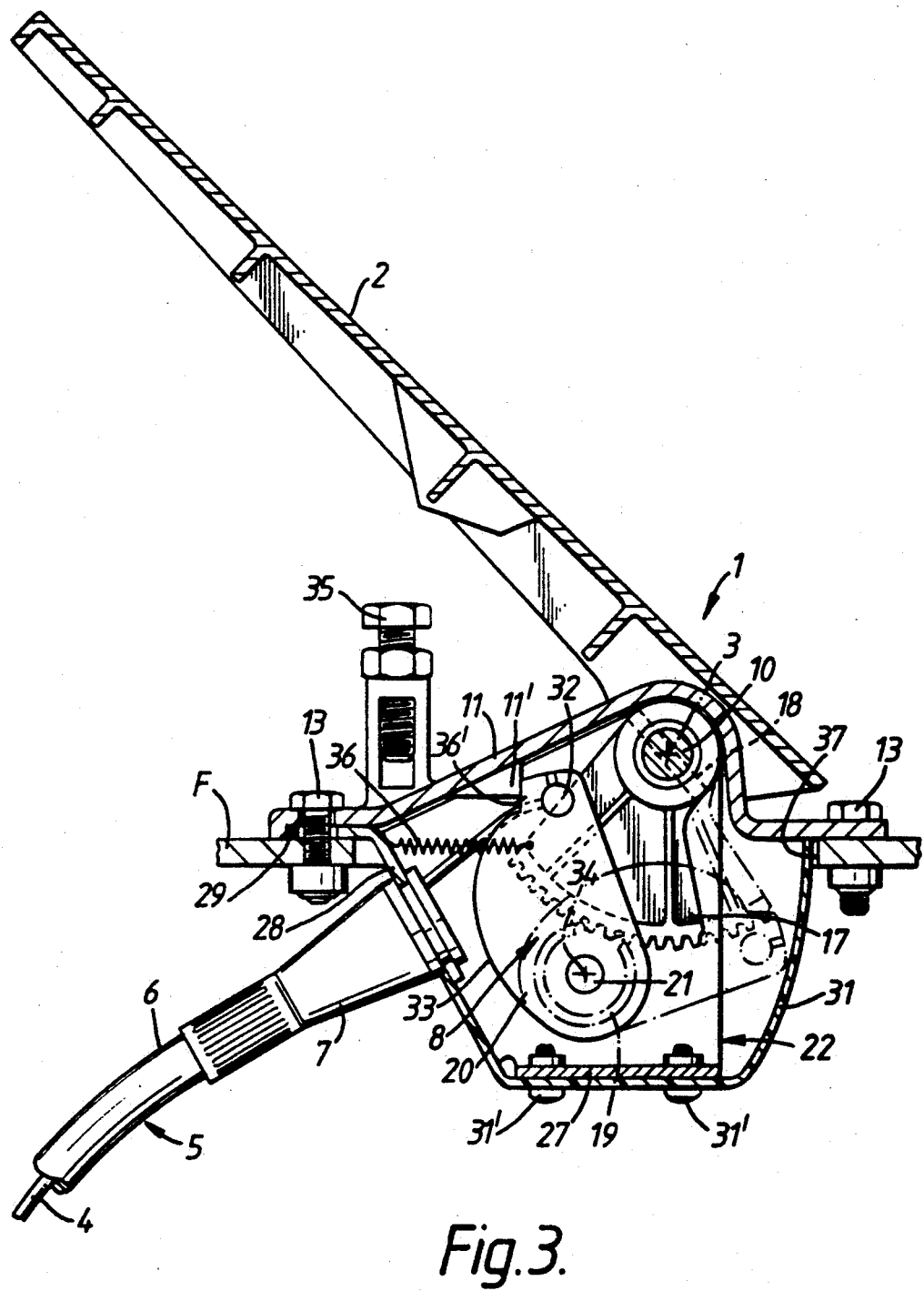
FIG. 3 is a sectioned side elevation taken along line III—III of FIG. 2.

Referring first to FIG. 1 and 3, a pedal operated mechanism 1 includes a foot pedal 2 which is mounted for pivotal movement in a vertical plane about a horizontal axis 3. Operatively attached to the foot pedal 2 so as to be translated as the pedal is depressed from its idle position shown in FIG. 3 is the core 4 of a pull cable 5 whose casing 6 is secured against movement by having swaged upon it a cable hub 7 itself fixed in position. The foot pedal 2 is operatively attached to the cable core 4 by a cam and gear mechanism, generally denoted by reference character 8, which is so designed that the loading required to depress the pedal, assuming a constant output load on the cable core 4, reduces the more the pedal is depressed, so as to give a substantially constant loading required on the pedal to match an increasing loading on the cable core, as will be explained.

Figure 2:
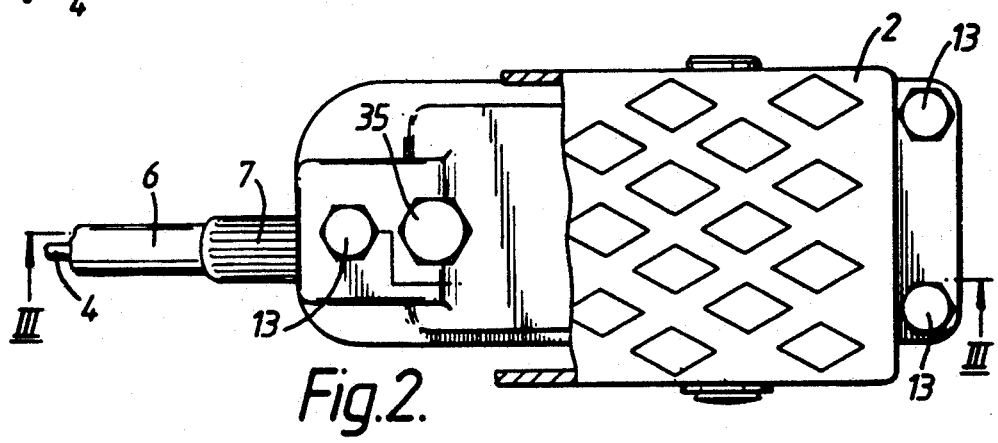
FIG. 2 is a top plan view taken in the direction of arrow A of FIG. 1.
Figure 4:
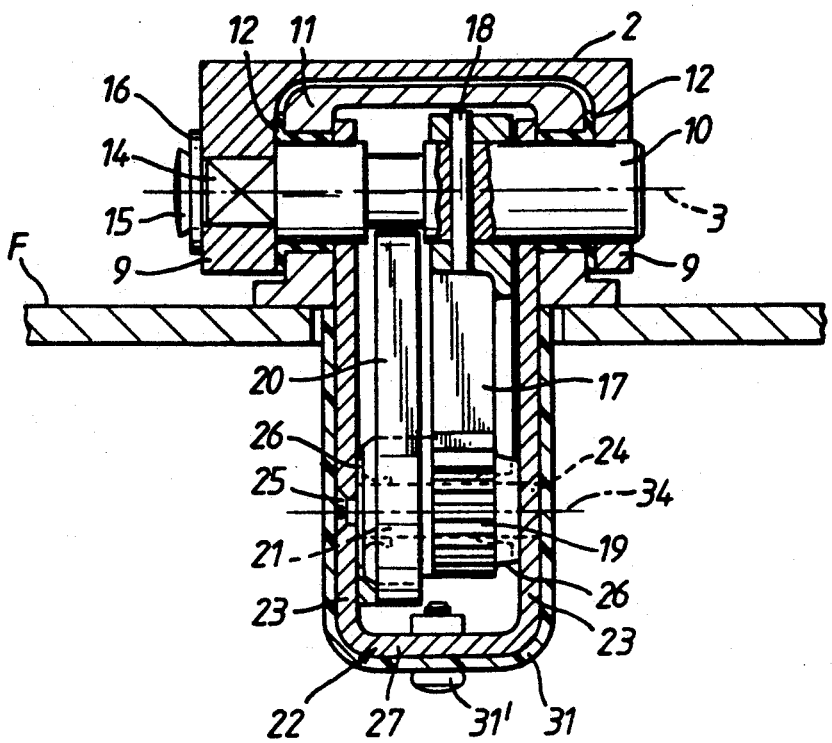
FIG. 4 is a sectioned end elevation taken along line IV—IV of FIG. 1.

More particularly, the foot pedal 2, as is shown in FIG. 4, is of U-shaped configuration with its opposite flanges 9 non-rotatably secured to a shaft 10 which is journalled for rotation in a base member 11 via bearing sleeves 12. The base member 11 is secured to the floor F of a vehicle by three bolt fixings 13, as particularly shown in FIGS. 1, 2 and 3. The pedal flanges 9 may be made rotatably fast with the shaft 10 in any suitable fashion; as shown one end 14 of the shaft 10 is of square cross-section and mounted in a complementary aperture in one pedal flange and with the projecting portion 15 of the shaft peened over a washer 16 positioned against the outer face of that same flange. As an alternative, the periphery of one or both ends of the shaft 10 could be serrated and a slide fit in matching serrated apertures in the pedal flanges 9 with, again, one end of the shaft peened over as by orbital rivetting.

The cam and gear mechanism 8 includes a quadrant gear 17 which is non-rotatably secured to the shaft 10 in any suitable fashion. As shown, the quadrant gear 17 is affixed to the shaft 10 by the radial pin 18 but, preferably, the quadrant gear and the shaft have mating serrations so that the gear is a slide fit on the shaft but is rotatably fast therewith. The quadrant gear 17 meshes with a pinion 19 which is fast with a snail cam 20 as by the two components being fashioned as a one-piece or unitary member.

Figure 5:
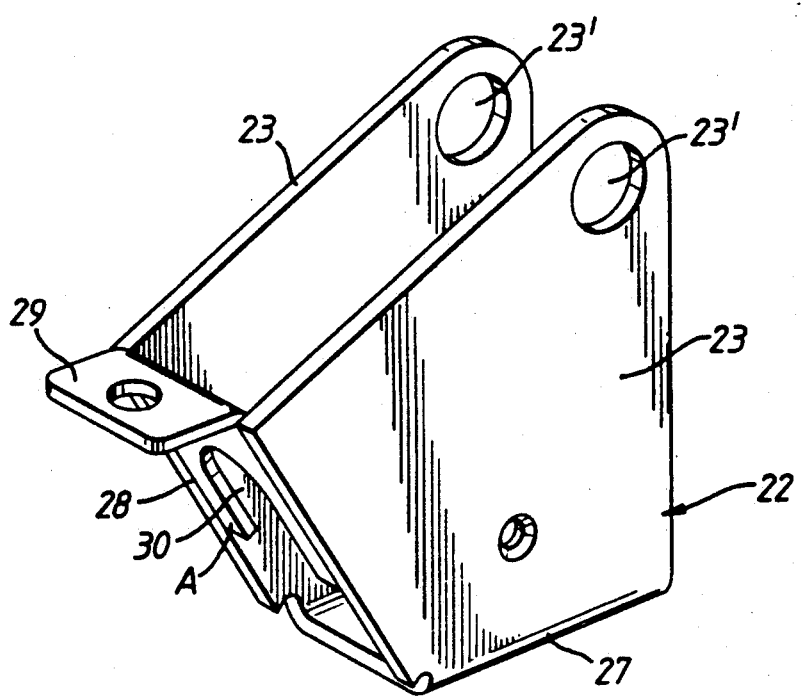
FIG. 5 is a perspective view of a bracket forming part of the pedal operated mechanism of FIG. 1.

The pinion 19 is mounted for rotation on a shaft 21 which also passes through the snail cam 20. A U-shaped bracket 22, as seen in FIG. 5, has its opposite flanges 23 apertured at 23' at their upper free ends by which the bracket is hung upon the shaft 10 with the quadrant gear 17, pinion 19 and snail cam 20 being positioned between those bracket flanges. The shaft 21 is mounted in position as by having one end 24 mounted in an aperture in the right hand bracket flange 23, the shaft being held against rotation by means of a countersunk screw 25 engaging in the left hand bracket flange 23 and the opposite end of the shaft. The combined pinion 19 and snail cam 20 oscillate about the shaft 21 by means of bearing sleeves 26.

The left hand (as viewed in FIG. 3) or rear edges of the bracket flanges 23 are inclined away from the web 27 inconnecting those flanges and are bridged in the upper region of the bracket 22, by a plate 28, best shown in FIG. 5. A rearwardly turned horizontal flange 29 is integral with and extends from the upper end of the plate 28. One of the bolt fixings 13 passes through both the base member 11 and the plate flange 29 to secure the plate 28 to the floor F. Thereby, the bracket 22 is restrained from pivotal movement about the shaft 10 on which it is hung.

A slot 30 extends upwardly in the plate 28 from its lower edge. The cable hub 7 is engaged in the slot 30 and is retained therein by a U-shaped plastic cover 31 which envelopes the bracket 22 and is secured to the bracket web 27 by screw and nut fixings 31' to enclose the mechanism under the floor F by which to exclude foreign matter from entering the mechanism and cable system. By the arrangement described, the cable hub 7 and hence the cable casing 6 is secured against translation with the cable core 4.

The end of the cable core 4 has staked upon it, so as to extend transversely on both sides of the core, a nipple or lug 32 which is entered into a receiving aperture in the upper region of the snail cam 20. Successive regions of the cam periphery 33 of the snail cam 20 engage the cable core 4 as the snail cam is rotated with the pinion 10 about the rotational axis 34, the radius of pick-up of the cable core on the cam periphery decreasing as the foot pedal 2 travels through its downward stroke. Thus, the snail cam 20 provides a continuously increasing velocity ratio for the mechanism, the start velocity ratio being 1.1 to 1 when the foot pedal 2 is in its idle position at a start angle of 45° as shown rising to 1.9 to 1 as the foot pedal travels through a downwardly angular range of movement of 20° commensurate with a 40 m.m. linear movement of the cable core 4. The increasing velocity ratio is matched to the increasing load on the cable core 4 the more it is translated to give a substantially constant load feel on the foot pedal 2 throughout its travel range.

This particular pedal operated mechanism 1 is designed to operated an injection pump unit of a heavy truck with the cable core 4 operating the pump lever against a return spring so that the loading on the cable core increases the more the pump lever is loading on the cable core in this particular application is 14 kg.

The limit of downward travel of the foot or accelerator pedal 2 is determined by an adjustable stop 35. Moreover, the start angle of the pedal is also adjustable and determined by the initial assembly of the quadrant gear 17 with the pinion 19. The pedal 2 and cable core 4 are lightly spring returned to the start position as by a tension spring 36 anchored at one end to the quadrant gear 17 and at the opposite end to the plate 28. The upward travel of the pedal 2 is restricted by a limit stop 36' on the snail cam 20 engaging a limit stop 11' on the base member 11.

It is believed that the operation of the foot pedal mechanism 1 will be apparent from the above description. Briefly, however, the application of foot pressure upon the pedal 2 causes the pedal to pivot anti-clockwise (as viewed in FIG. 3) about the horizontal axis 3 so rotating the quadrant gear 17 anti-clockwise clockwise about the same axis which, in turn, rotates the meshing pinion 19 clockwise about the axis 34 together with the integral snail cam 20 which, by virtue of its continuously increasing velocity ratio as successive regions of its cam periphery 33 engages the cable core, compensates for the increasing governor spring loading on the distal end of the cable core and so gives a constant load feel through the pedal travel.

The pedal operated mechanism or unit 1 is, furthermore, designed to be sold cabled and sealed ready for customer installation to vehicle by posting the cable 5 through a prepared hole 37 in the vehicle floor F, and securing the pedal unit from inside the vehicle into captivated nuts at the bolt fixings 13. The cable is then connected to the injection pump unit, and the pedal stop 35 adjusted accordingly to eliminate overloading of the pump lever and the cable system.

The pedal base, gears and snail cam may be die cast, the U-bracket and pivot shafts may be of mild steel, the plastic cover may be moulded of nylon and the bearing sleeves may also be of a suitable synthetic plastics material.

Figure 6:
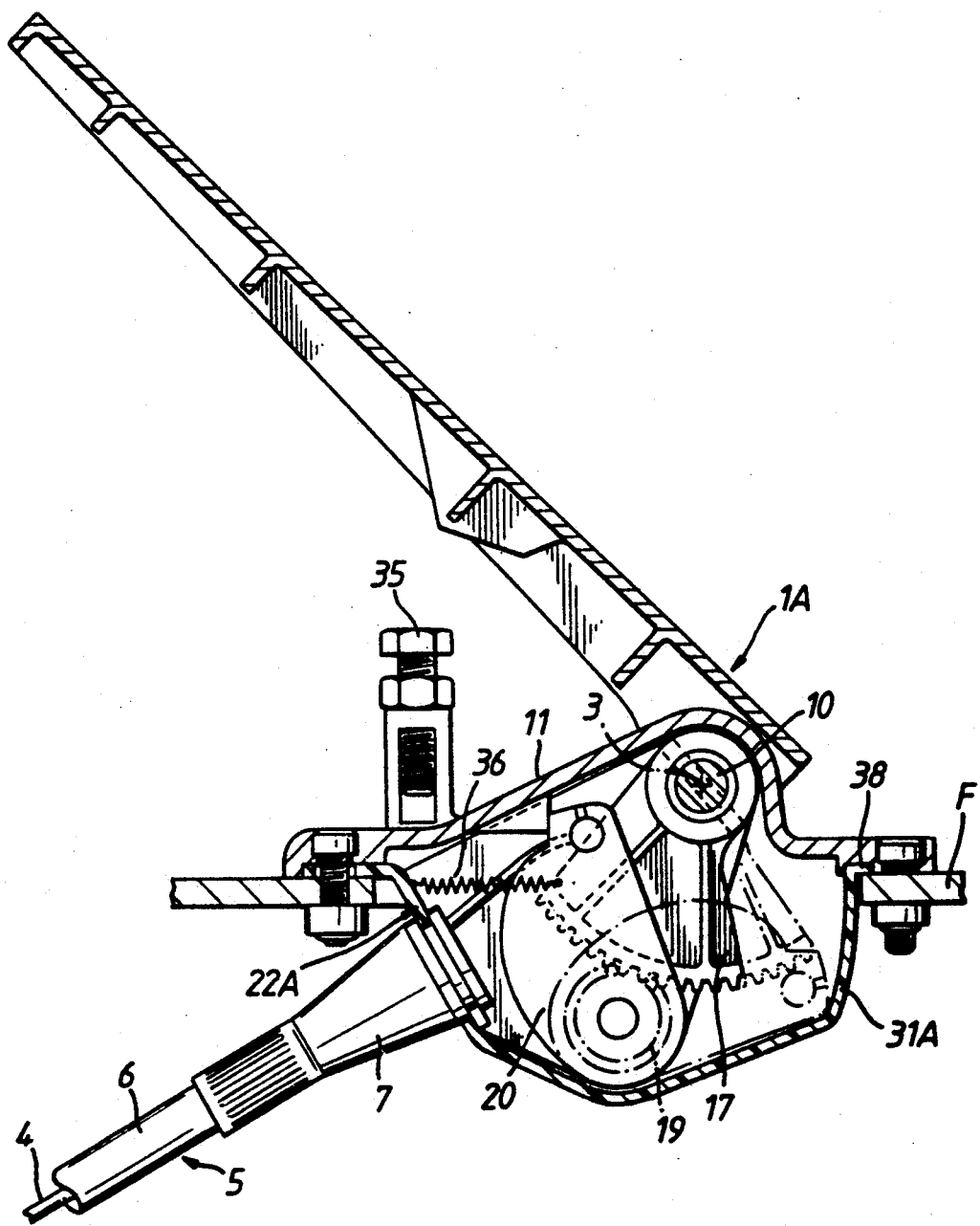
FIG. 6 is a sectioned side elevation of a modified pedal operated mechanism.
Figure 7:
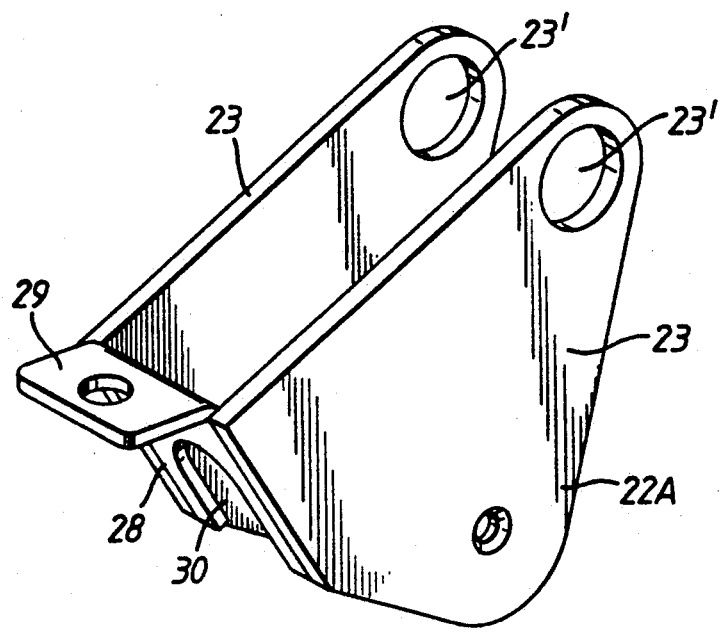
FIG. 7 is a perspective view of a modified bracket forming part of the pedal operated mechanism of FIG. 6.
Figure 8:
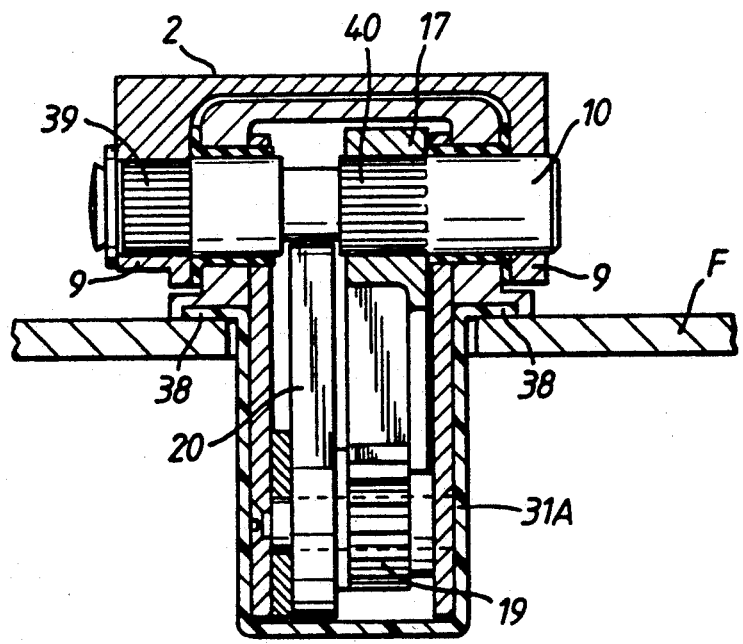
FIG. 8 is a sectioned end elevation of the pedal operated mechanism of FIG. 6.
Figure 9:
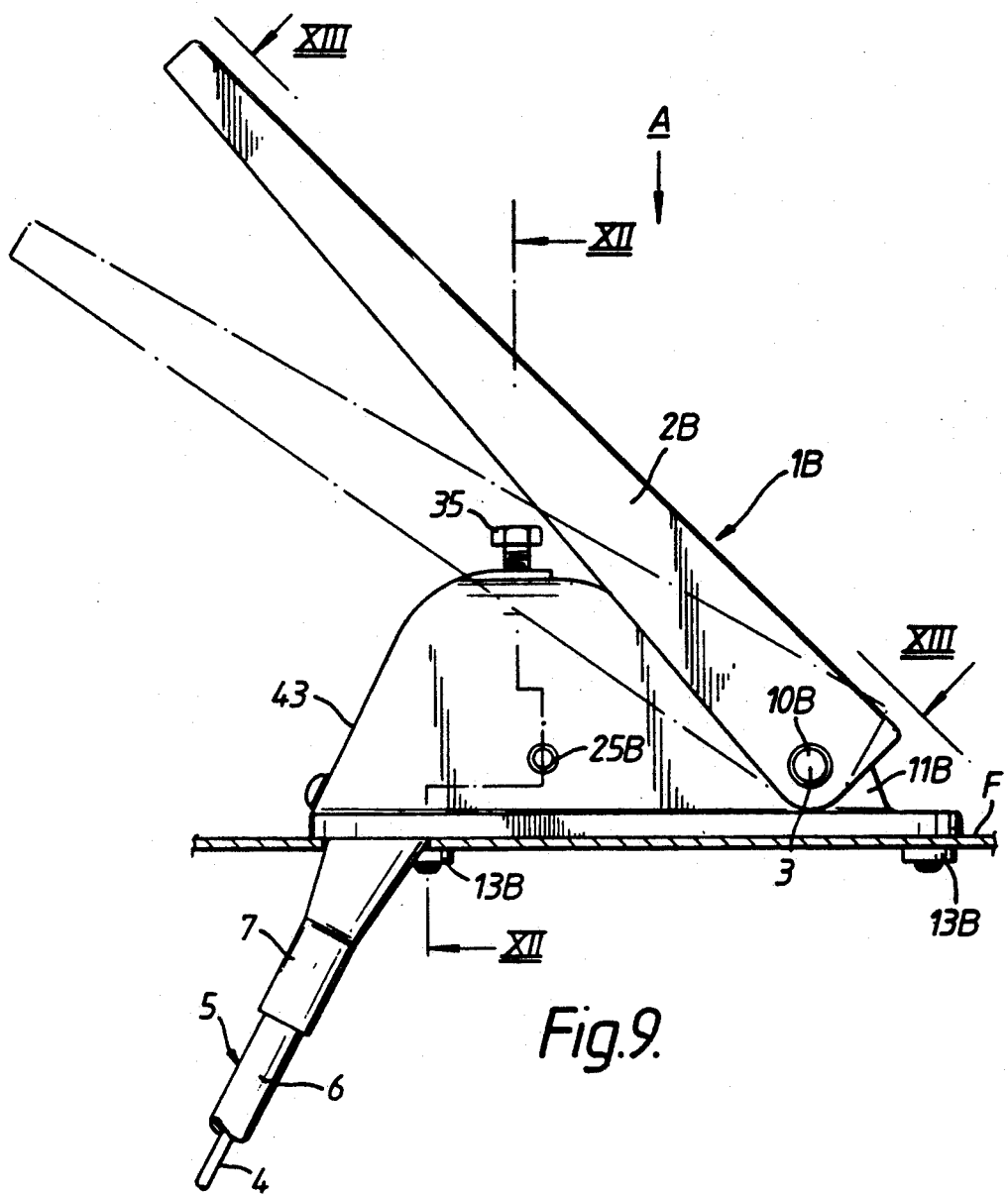
FIG. 9 is a side elevation of a third embodiment of pedal operated mechanism.
Figure 10:
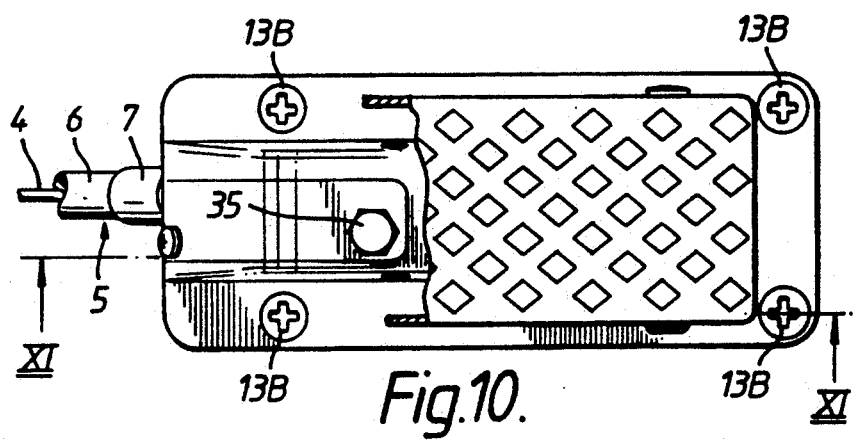
FIG. 10 is a top plan view taken in the direction of arrow A of FIG. 9.
Figure 11:
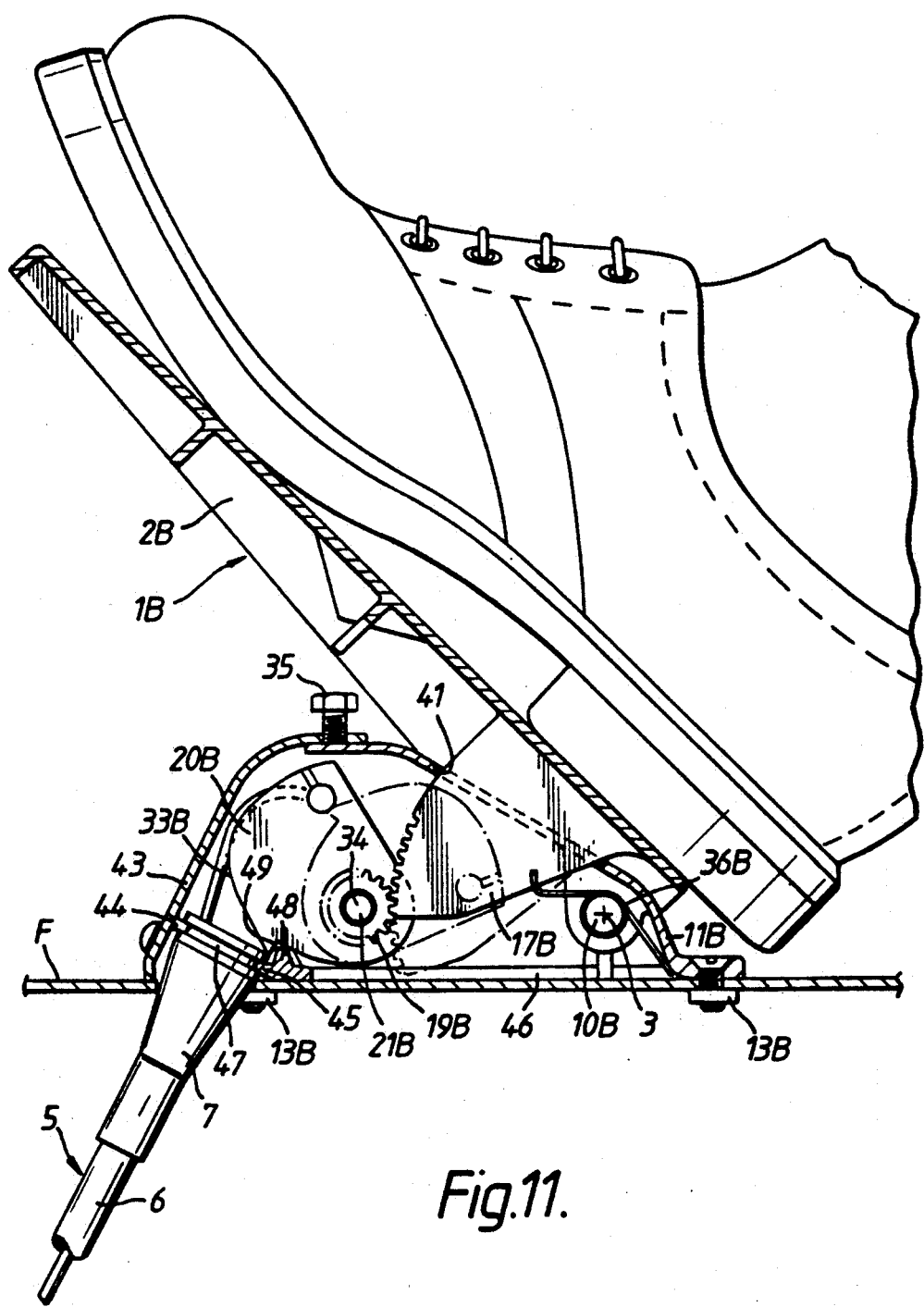
FIG. 11 is a sectioned side elevation taken along line XI—XI of FIG. 10.
Figure 12:
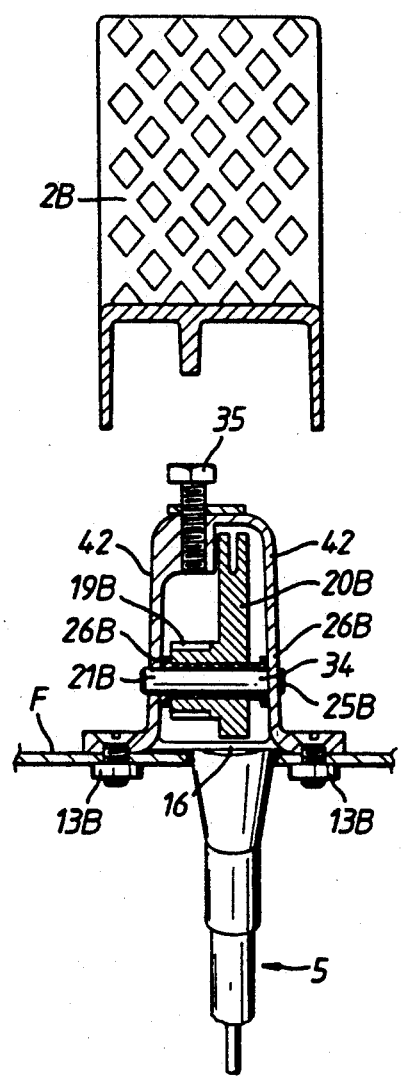
FIG. 12 is a sectioned end elevation taken along line XII—XII of FIG. 9.
Figure 13:
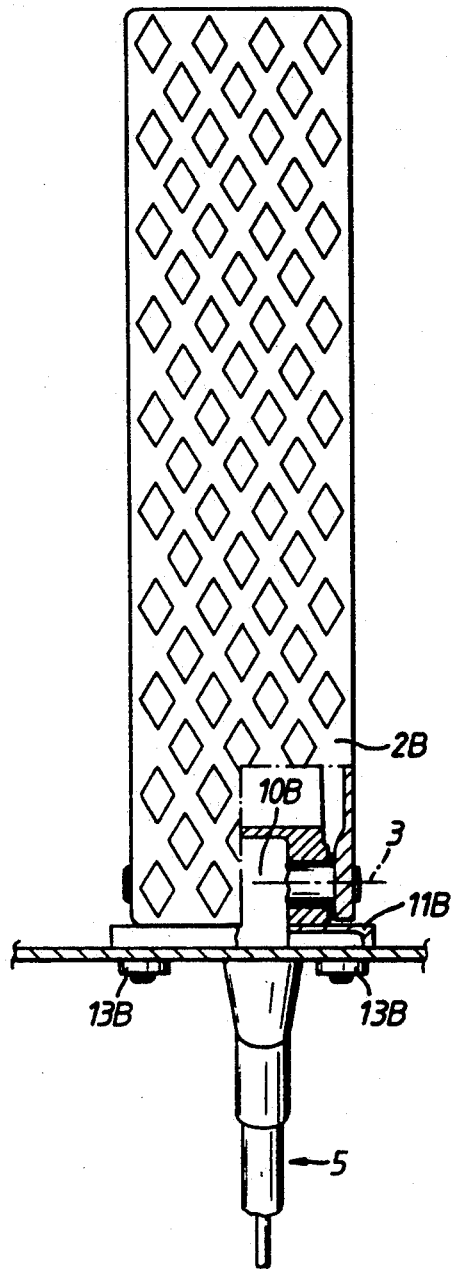
FIG. 13 is a part-sectioned elevation taken along line XIII—XIII of FIG. 9.

Referring now to FIGS. 6 to 8 showing a modified pedal operated mechanism 1A, the unit is similar to that of the first embodiment and differs by the structure occupying less depth under the vehicle floor F. To that end, the bracket 22A is deficient of the web and the U-shaped plastic cover 31A instead of being bolted to the bracket has its upper ends turned outwardly to form flanges 38 which are trapped between the base member 11 and the floor F, as best shown in FIG. 8 which also shows the serrated interengagement at 39 of the shaft 10 with one of the pedal flanges 9 and at 40 of the quadrant gear 17 with that shaft.

A third embodiment of pedal unit or pedal operated mechanism 1B which is depicted in FIGS. 9 to 13 is against similar to the first embodiment shown in FIGS. 1 to 5, differing therefrom primarily in that it is designed not to occupy space below the vehicle floor F but between the floor and the foot pedal 2B. In this instance, the quadrant gear 17B is made in one-piece as by die casting with the foot pedal 2B so that it pivots with the pedal about the horizontal axis 3 defined by the axis of the pedal pivot shaft 10B. Thereby, the teeth of the quadrant gear 17B are on a pitch circle struck about that axis. The pedal 2B is lightly spring biased to its idle position by a torsion leaf spring 36B mounted about the shaft 10B with one end engaging the quadrant gear 17B and its other end the base member 11B which is secured by four screw and nut fixings 13B to the vehicle floor F. The quadrant gear 17B pivots about the axis 3 through an opening 41 in the base member 11B.

The pinion 19B, meshing with the quadrant gear 17B, forms, as before, a unitary member which may be a die casting with the snail cam 20B, which unitary member is mounted for rotation about the longitudinal axis 34 of the pinion within the base member 11B and above the vehicle floor F. For this purpose, the unitary member 19B, 20B is rotatably mounted by means of bearing sleeves 26B of a suitable synthetic plastics material on a fixed shaft 21B mounted in opposite walls 42 of the base member 11B and held against rotation by a screw 25B engaging the right hand wall 42.

The front of the base member 11B is open, and a front cover plate 43 is suitably secured to it. The cable hub 7 enters the base member 11B through a small opening in the vehicle floor 12 and is engaged on one side by a part circular protrusion 44 integral with the front cover plate 43 and on its opposite side by a similar protrusion 45 integral with a base plate 46 itself an integral part of the base member 11B, both protrusions engaging in an annular groove 47 of the cable hub 7 to hold the hub against movement. The base plate 46 also provides a stop 48 which engages a stop 49 formed at the extremity of the cam periphery 33B to restrict upward travel of the pedal.

The velocity ratio of the snail cam 20B is the same as in the previous embodiments and the pedal unit 1B functions in a similar manner to those embodiments so that additional description of its operation is not deemed necessary.

Whilst not illustrated, the cam surface 33 of the snail cam 20 and the cam surface 33B of the snail cam 20B would, in practice, comprise a grooved region in the periphery of the snail cam to provide the cable core 4 with lateral constraint.

Referring, finally, to FIGS. 14 to 17 showing the fourth, and preferred embodiment of pedal operated mechanism or pedal unit 1C, the unit is designed to occupy space basically below the vehicle floor F, much in the manner of the first embodiment. Whilst the design functional fundamentals remain the same, certain structural improvements are incorporated as will appear.

In this preferred construction, the base member, U-shaped bracket and plastics cover of the first embodiment are replaced by a split body 50 comprising right and left hand (as viewed in FIG. 17) body halves 50a and 50b, respectively, secured together by screw fixings 51 along a vertical joint line 52. The split body 50 maybe die cast in die cast alloys such as aluminum and mazak.

Figure 14:
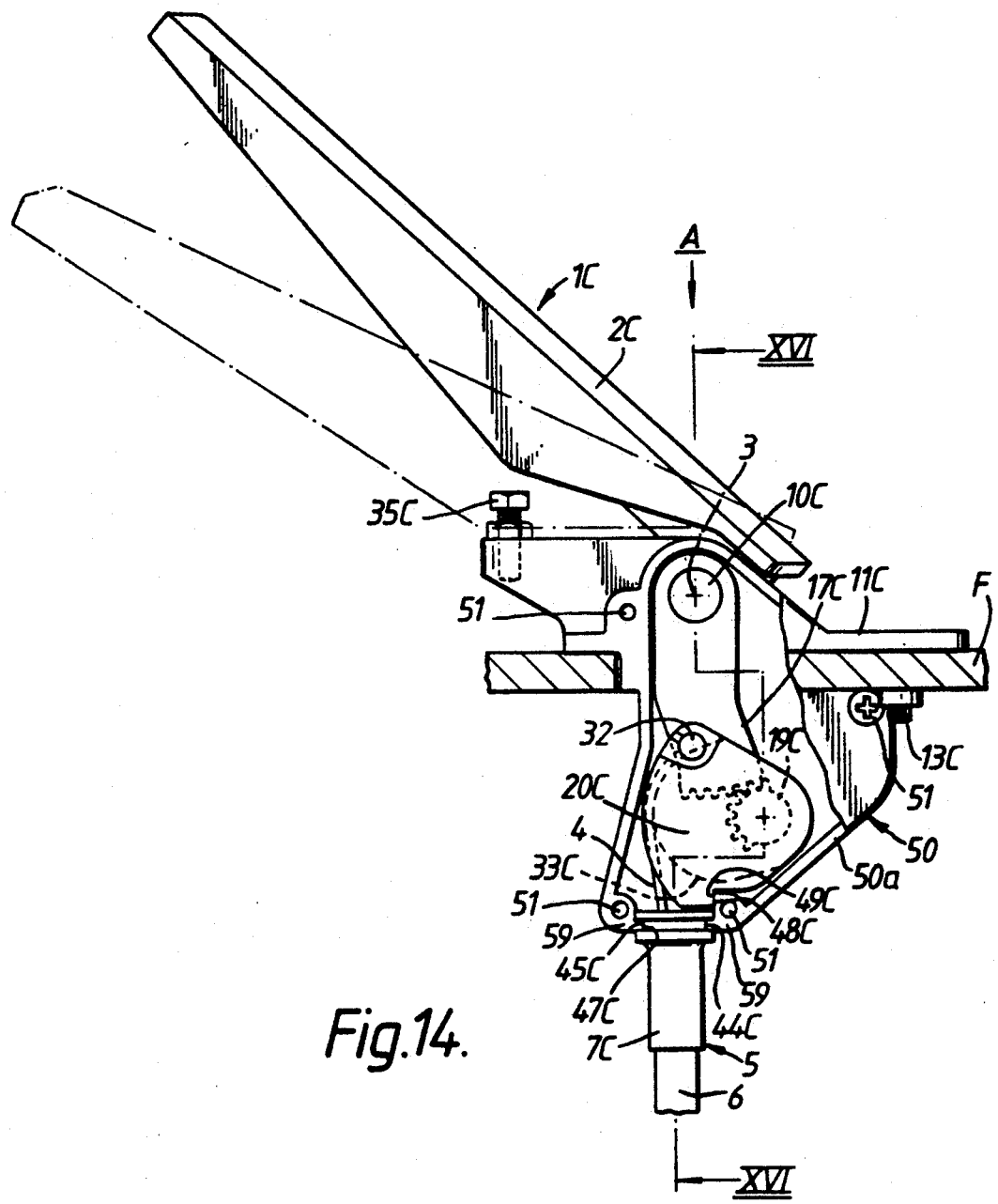
FIG. 14 is a side elevation of a fourth, and preferred, embodiment of pedal operated mechanism with the left side of the body thereof removed.
Figure 15:
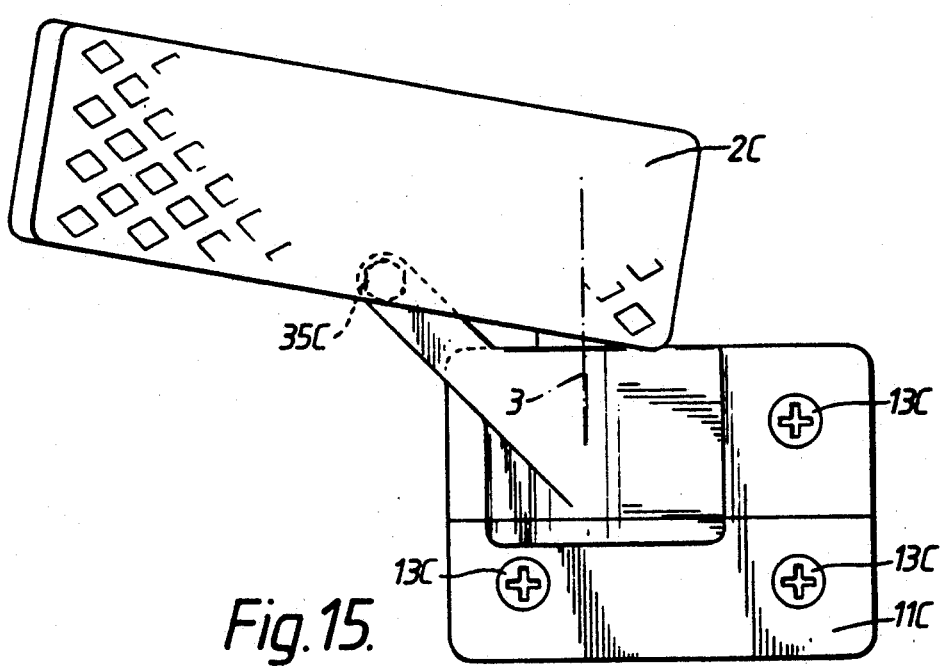
FIG. 15 is a top plan view taken in the direction of arrow A of FIG. 14.
Figure 16:
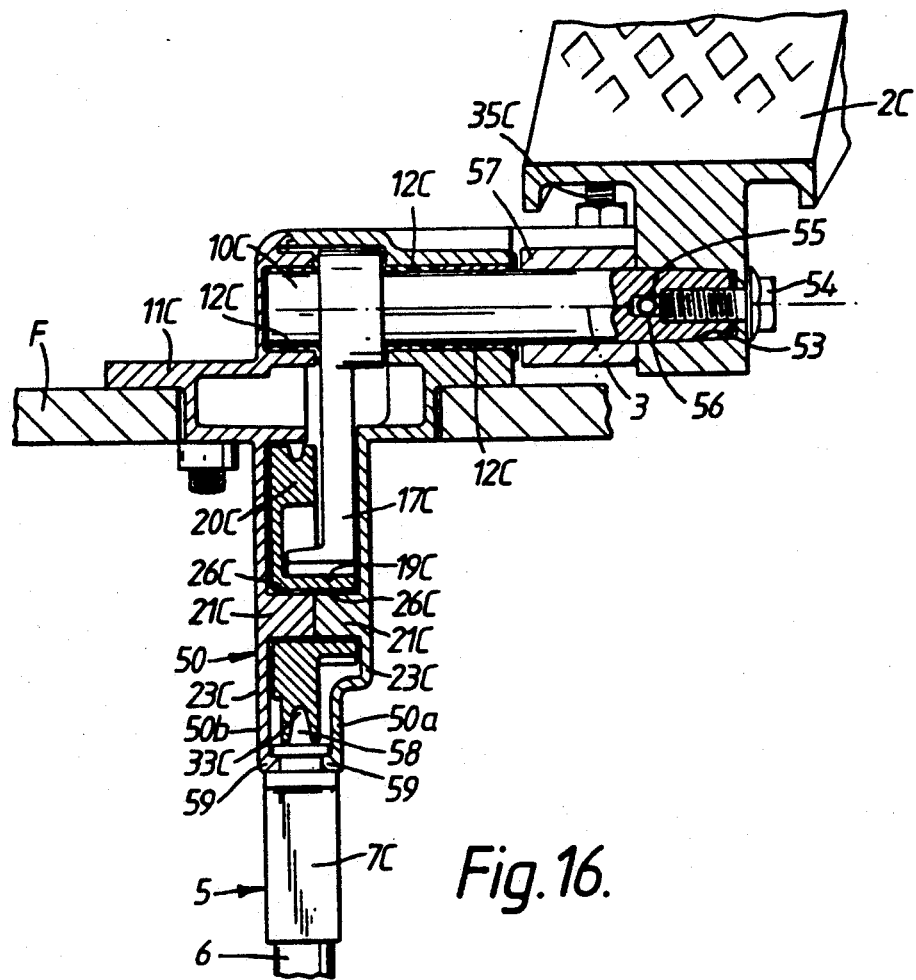
FIG. 16 is a partial sectioned end elevation taken on line XVI—XVI of FIG. 14.
Figure 17:
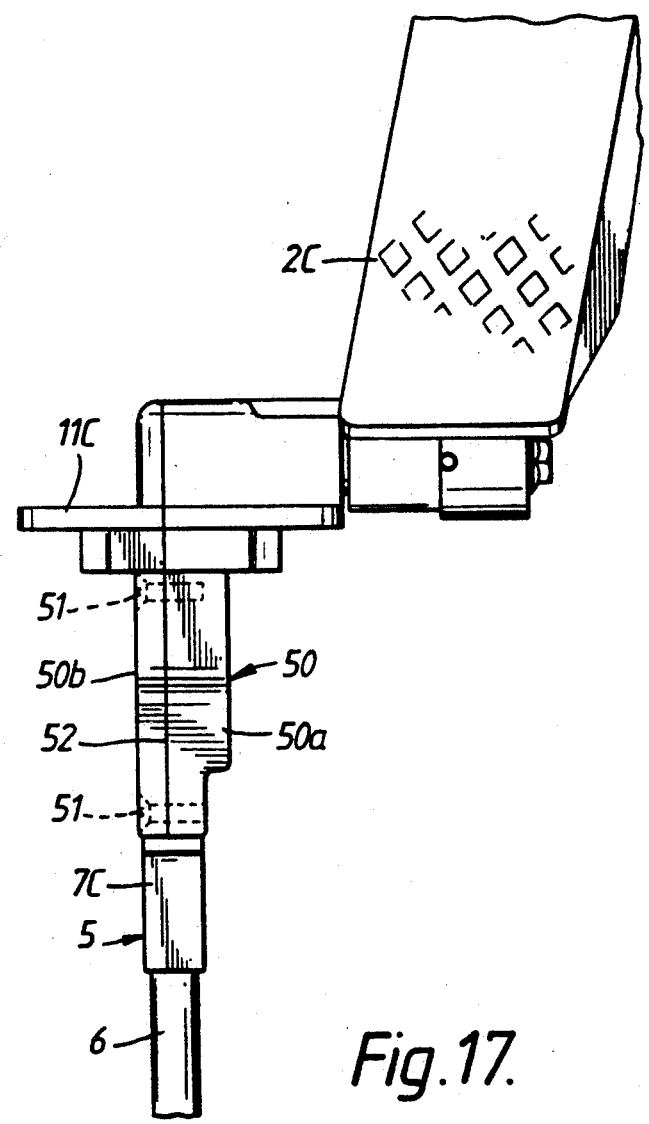
FIG. 17 is a partial end elevation of the fourth embodiment of pedal operated mechanism.

The two body halves 50a and 50b of the split body 50 together provide a base member 11C which is secured to the vehicle floor F by three bolt fixings 13C as best shown in FIGS. 14 and 15. The foot pedal 2C does not straddle the base member 11C as before (although it may do), but rather is mounted in cantilever fashion on the shaft 10C which is journalled for rotation in the base member 11C via bearing sleeves 12C. The shaft 10C extends outwardly of the right hand part of the base member 11C, being further supported at its exit therefrom by a third bearing sleeve 12C, and the foot pedal 2C has a complimentary aperture and is mounted thereon to the tapered shaft extension to be secured thereto by a bolt fixing 54. To ensure that the foot pedal 2C is mounted in its correct angular position, its mounting aperture includes a keyway 55 in which is located a pin 56 fast with the shaft 10C, the pin and keyway also acting as a secondary drive means ensuring rotation of the shaft by the foot pedal in the event of the bolt fixing 54 loosening. In the construction shown in FIG. 16, a spacer 57 distances the foot pedal 2C from the right hand part of the base member 11C, but the spacer could be dispensed with and the foot pedal mounted on a shorter shaft so as to be adjacent the base member 11C. Whether the foot pedal 2C straddles the base member, is spaced from it or is in juxtaposition to it, is dependent on the operating requirements.

Rotationally fast with the shaft 10C and preferably integral therewith is the quadrant gear 17C. In this particular embodiment, the quadrant gear and the shaft are case as one in, for example, steel. The quadrant gear 17C extends downwardly from the base member part of the split body 50 into the region thereof positioned below the floor F, there to mesh, as in the first embodiment, with the pinion 19C having gear teeth over only a part of its periphery and which is rotationally fast with the snail cam 20C. Again the pinion and snail cam are preferably integral with one another, as by being cast as one, again for example, in zinc alloy. The unitary pinion and snail cam unit are rotationally mounted, via bearing sleeves 26C preferably of a plastics material, on a horizontal shaft formed by pins 21C each extending inwardly from and made integral with the depending side wall 23C of the respective body half 50a, 50b.

The pull cable 5 has its core 4 provided, as before, with the lug 32 entered into the receiving aperture in the snail cam 20C, with the periphery of the snail cam notched at 58 to provide, at the base of the notch, the cam surface 33C successive regions of which are engaged with the cable core 4 as the snail cam 20C is rotated clockwise to translate the core axially in response to the foot pedal 2C being urged downwardly and effecting anticlockwise rotation of the quadrant gear 17C with attendant clockwise rotation of the pinion 19C. The side walls of the notch 58 provide lateral constraint upon the cable core 4.

The cable housing 7, as before, is retrained against movement with the translated cable core 14 by its cable hub 7C being fixed in position. In this embodiment, the right hand body half 50a is assembled with the unitary shaft 10C and quadrant gear 17C and with the unitary pinion and snail cam unit 19C, 20C mounted on its integral pin 21C, and the cable hub 7C is entered into a hole fashioned partly in the lowermost wall 59 of the right hand body half 50a so that a rib 44C defining that part hole and integral with the wall 59 of that body half engages in half the periphery of the peripheral groove 47C of the cable hub; and the left hand body half 50b is then fitted to the body half 50a to locate on the extended portion of the shaft 10C, locate its integral pin 21C in the unitary pinion and snail cam unit, and engage its rib 45C (which is integral with its lowermost wall 59 and which, together with the rib 44C, defines the aforementioned hole) with the other part of the peripheral groove 47C of the cable hub, thereby to hold the cable hub, and hence the cable housing 6 on which it is swaged, against movement when the two body halves are secured together by the screw fixings 51. It is to be understood that the orientation of the cable hub 7C is not necessarily vertical and would be determined by the functional requirements of the mechanism.

As before, the limit of downward pivotal movement of the foot pedal 2C is determined by an adjustable stop 35C. Upward travel of the foot pedal is restricted by the engagement of a stop 49C on the snail cam 20C with a stop surface 48C formed jointly on the secured together body halves 50a, 50b. A spring biasing means as provided in any of the previous embodiments could be provided to return the foot pedal 2C to its upper, inoperative position, or, alternatively, the spring bias returning the pump lever of the injection pump unit could provide the return force.

The velocity ratio of the snail cam 20C may, once again, be the same as in the previous embodiments, and a person skilled in the art to which this specification is addressed will readily appreciate that the pedal unit 1C functions in a similar manner to that described previously, rendering unnecessary a further description of its operation.

As a further alternative, in any of the described embodiments, instead of the quadrant gear being rotationally fast with the pedal or the pedal pivot pin or shaft and the pinion being rotationally fast with the snail cam, this arrangement could be reversed if the functional requirements of the mechanism so determined.

Yet again, in still a further alternative, the velocity ratio of the snail cam instead of increasing, the more the pedal or other operator or input member is operatively moved, could decrease. An application calling for us a "reversed" velocity ratio would, for example, be that of a mechanism operating the butterfly valve of a carburetor with which initial angular movement results in a rapid change of flow cross-section which decreases the more the butterfly valve is opened.

I claim:

1. A remote control mechanism comprising a control member, a cam pivotable about an axis in response to operative movement of the control member, the cam having a variable velocity ratio, and a cable having a core translatable within a casing, the cable core being attached to the cam so as to be translated with respect to the cable casing as the cam is pivoted about the axis, successive regions of a surface of the cam engaging the cable core as the cam is pivoted about the axis, a pick-up radius of the cable core on the cam surface with respect tot he pivotal axis of the cam varying as the cam is pivoted by the operative movement of the control member.

2. A remote control mechanism as claimed in claim 1, wherein the velocity ratio of the cam increases as the cam is pivoted by the operative movement of the cam member.

3. A remote control mechanism as claimed in claim 1, wherein the velocity ratio of the cam decreases as the cam is pivoted by the operative movement of the cam member.

4. A remote control mechanism as claimed in claim 1, wherein the cam is a snail cam with a continually variable velocity ratio.

5. A remote control mechanism as claimed claim 1, including a meshing quadrant gear and pinion transferring operative movement of the control member to effect pivotal movement of the cam about the axis.

6. A remote control mechanism as claimed in claim 5, wherein the control member is pivotal about a second axis to execute its operative movement, one of the quadrant gear and pinion being rotationally fast with the pivotal control member so as to rotate about the second axis as the control member is pivoted, and the other of the quadrant gear and pinion being rotationally fast with the cam and mounted for rotation about the first-mentioned axis so as to rotate thereabout in response to the rotation about the second axis of said one of the quadrant gear and pinion thereby to effect said pivoting of the cam about the first-mentioned axis.

7. A remote control mechanism as claimed in claim 5, wherein the quadrant gear is rotationally fast with the pivotal control member and the pinion is rotationally fast with the cam.

8. A remote control mechanism as claimed in claim 7, wherein the control member is a foot pedal which is rotationally fast with a shaft, the shaft being rotationally mounted in a base member, the axis of the shaft constituting the first mentioned axis.

9. A remote control mechanism as claimed in claim 8, wherein the quadrant gear is fast with the foot pedal, a pitch circle diameter of the gear teeth of the quadrant gear being stuck about the axis of the shaft.

10. A remote control mechanism as claimed in claim 8, wherein the quadrant gear is rotationally fast with the shaft, a pitch circle diameter of the gear teeth of the quadrant gear being struck about the axis of the shaft.

11. A remote control mechanism as claimed in claim 10, wherein the quadrant gear is integral with the shaft.

12. A remote control mechanism as claimed in claim 8, wherein the base member is fashioned for being secured by bolt fixing means to an upper surface of a floor.

13. A remote control mechanism as claimed in claim 12, wherein the quadrant gear, pinion and cam are positioned above a floor when the base member is bolted to the upper surfaces thereof, the pinion being rotationally fast with a second shaft mounted for rotation in the base member.

14. A remote control mechanism as claimed in claim 12, wherein the foot pedal shaft is mounted above the floor, and the pinion is rotationally fast with a second shaft which is mounted for rotation in a housing member, the second shaft being positioned below the floor when the base member is bolted to the upper surface of the floor.

15. A remote control mechanism as claimed in claim 14, wherein the housing member comprises a bracket which is suspended on the foot pedal shaft and restrained against pivotal movement thereon by at least one bolt fixing means.

16. A remote control mechanism as claimed in claim 14, wherein the housing member is integral with the base member.

17. A remote control mechanism as claimed in claim 16, wherein the combined integral housing and base members together constitute a body which is split in endwise fashion into two body halves secured together.

18. A remote control mechanism as claimed in claim 17, wherein the foot pedal is secured to its shaft by a bolted, tapered fitting, and angularly located relative to the shaft by a keyway fitting serving as a secondary driving means between the foot pedal and the shaft.

19. A remote control mechanism as claimed in claim 17, wherein the cable housing is restrained against translational movement with the casing core by means of a cable hub secured to the housing being engaged by ribs integral with the respective body halves.

20. A remote control mechanism as claimed in claim 1, wherein the velocity ratio varies between 1.1 to 1 and 1.9 to 1 as the operating member travels through an angular range of movement of 20° commensurate with a 40 mm linear travel of the cable core.

21. A remote control mechanism as claimed in claim 14, including an adjustable stop fast with the base member for restricting a downward travel of the foot pedal, and further including a stop surface formed on the cam and engaging a stop surface associated with the base member or housing member for restricting an upward travel of the foot pedal.

* * * * *